United States Patent
Hayashihara et al.

(10) Patent No.: US 6,808,040 B2
(45) Date of Patent: Oct. 26, 2004

(54) VEHICLE-PEDAL-BACKWARD-DISPLACEMENT PREVENTING DEVICE FOR PREVENTING DISPLACEMENT OF DEPRESSABLE PORTION OF OPERATING PEDAL TOWARD OPERATOR'S SEAT

(75) Inventors: Takashi Hayashihara, Toyota (JP); Isao Yagi, Toyota (JP); Takumi Uno, Okazaki (JP)

(73) Assignee: Toyoda Iron Works Co., Ltd., Toyota (JP)

( * ) Notice: Subject to any disclaimer, the term of this patent is extended or adjusted under 35 U.S.C. 154(b) by 0 days.

(21) Appl. No.: 10/200,550

(22) Filed: Jul. 23, 2002

(65) Prior Publication Data

US 2003/0019683 A1 Jan. 30, 2003

(30) Foreign Application Priority Data

Jul. 24, 2001 (JP) ........................................ 2001-222755
Mar. 15, 2002 (JP) ........................................ 2002-072812

(51) Int. Cl.[7] .............................................. G05G 1/14
(52) U.S. Cl. ........................ 180/315; 180/274; 74/512
(58) Field of Search ................................. 180/315, 274, 180/275; 74/512, 513, 560

(56) References Cited

U.S. PATENT DOCUMENTS 5,615,749 A * 4/1997 Kato ........................... 180/274
5,848,558 A   12/1998 Isono et al.
5,848,662 A * 12/1998 Sakaue ........................ 180/274
6,006,626 A   12/1999 Notake et al.
6,070,488 A *  6/2000 Yabusaki et al. ............ 74/512
6,327,930 B1 * 12/2001 Ono et al. ................... 74/512
6,339,971 B1   1/2002 Kato
2001/0027696 A1 * 10/2001 Mizuma et al. .............. 74/512
2002/0189391 A1 * 12/2002 Matsumoto et al. .......... 74/512

FOREIGN PATENT DOCUMENTS

| JP | 06-211115 | 8/1994 |
| JP | A-H9-123948 | 5/1997 |
| JP | 10-250624 | 9/1998 |
| JP | 10-324228 | 12/1998 |
| JP | 2000-142475 | 5/2000 |
| JP | A-2001-114135 | 4/2001 |
| JP | A-2001-163196 | 6/2001 |

* cited by examiner

*Primary Examiner*—Michael J. Carone
*Assistant Examiner*—Gabriel S. Sukman

(57) ABSTRACT

A vehicle-pedal-backward-displacement preventing device for preventing a depressable portion of an operating pedal from being displaced toward an operator's seat of the vehicle in the event of displacement of a dash panel of the vehicle toward the operator's seat. The device includes a connecting member which is disposed between a pedal bracket and a reinforcement member of the vehicle and connects the pedal bracket with the reinforcement member, and which is deformable in the event of displacement of the dash panel toward the operator's seat. The connecting member includes a contactable portion which is to be brought into contact with the operating pedal upon deformation of the connecting member, for thereby causing the operating pedal to be pivoted in such a direction that causes the depressable portion of the operating pedal to be displaced in the forward direction of the vehicle.

9 Claims, 5 Drawing Sheets

VEHICLE-PEDAL-BACKWARD-DISPLACEMENT PREVENTING DEVICE FOR PREVENTING DISPLACEMENT OF DEPRESSABLE PORTION OF OPERATING PEDAL TOWARD OPERATOR'S SEAT

BACKGROUND OF THE INVENTION

1. Field of the Invention

This invention relates in general to a vehicle-pedal-backward-displacement preventing device for preventing a depressable portion of a vehicle operating pedal from being backwardly displaced toward a vehicle operator's seat in the event of displacement of a dash panel toward the vehicle operator's seat.

2. Discussion of the Related Art

There is widely known an operating pedal of a vehicle, such as a brake pedal and an accelerating pedal, which is pivotably supported by a pedal bracket attached to a dash panel of the vehicle and which has in its lower end portion a depressable portion to be depressed in a forward direction of the vehicle by an operator of the vehicle, wherein the operating pedal is pivotable about an axis that is substantially parallel to a horizontal direction and a transversal (right and left) direction of the vehicle. There is proposed a vehicle-pedal-backward-displacement preventing device for preventing the depressable portion of the operating pedal from being backwardly displaced toward a vehicle operator's seat in the event of displacement of the dash panel toward the operator's seat, for example, due to an accidental application of large load to a front portion of the vehicle in the backward direction of the vehicle. An example of such a vehicle-pedal-backward-displacement preventing device is disclosed in JP-A-H9-123948 (publication of unexamined Japanese Patent Application laid open in 1997) In this device disclosed in JP-A-H9-123948, a bracket is buckled or deformed together with deformation of a dash panel, in such a direction that causes a pivot axis of an operating pedal to be displaced backwardly along an elongated hole which is formed through the bracket, whereby the operating pedal is pivoted about a connection point, at which the operating pedal is connected with an operating (push) rod, in such a direction that causes a pedal pad (depressable portion) of the pedal to be forwardly displaced. A device disclosed in JP-A-2001-114135 (publication of unexamined Japanese Patent Application laid open in 2001) also utilizes an operating (push) rod connected with an operating pedal, for thereby preventing a pedal pad of the pedal from being backwardly displaced. A device disclosed in JP-A-2001-163196 (publication of unexamined Japanese Patent Application laid open in 2001) has, in addition to a first bracket which supports an operating pedal, a second bracket which is connected with the first bracket and a reinforcement member located within a passenger compartment, such that the second bracket is disconnected from the first bracket upon deformation of the dash panel, and is then brought into abutting contact with the operating pedal, whereby the operating pedal is pivoted in such a direction that prevents a pedal of the pedal from being backwardly displaced.

However, in the device disclosed in JP-A-H9-123948 which is designed on the assumption that the dash panel is displaced in a larger amount than the connection point, it is not possible to satisfactorily prevent backward displacement of the pedal pad of the operating pedal, for example, where the displacement amount of the dash panel is not larger than that of the connection point by at least a certain amount, or where the displacement amount of the dash panel is small. Further, the device of JP-A-H9-123948 can not be used for an operating pedal of a parking brake device which is not equipped with an operating rod connected with the operating pedal. The device of JP-A-2001-114135 can not be used for an operating pedal of such a brake device which is not equipped with an operating rod, either.

The device disclosed in JP-A-2001-163196 has difficulty in designing and manufacturing, particularly, its structure required for the connection of the first and second brackets, because the structure necessarily has to permit the first and second brackets to be assuredly disconnected from each other in the event of deformation of the dash panel, while reliably maintaining the connection of the two brackets with a high strength during a routine pedaling operation except in the event of deformation of the dash panel.

SUMMARY OF THE INVENTION

It is therefore an object of the present invention to provide a pedal-backward-displacement preventing device, which is capable of satisfactorily preventing a depressable portion of an operating pedal from being backwardly displaced toward an operator's seat even where a dash panel is displaced in a small amount, which can be used for even an operating pedal of a parking brake device which is not equipped with an operating rod connected with the operating pedal, and which is relatively easy to be designed and manufactured. This object may be achieved according to any one of first through ninth aspects of this invention which are described below.

The first aspect of the invention provides a pedal-backward-displacement preventing device for a vehicle having a dash panel, a pedal bracket attached to the dash panel, and an operating pedal pivotally supported by the pedal bracket and having in a lower end portion thereof a depressable portion to be depressed in a forward direction of the vehicle by an operator of the vehicle. The pedal-backward-displacement preventing device is capable of preventing the depressable portion of the operating pedal from being displaced in a backward direction of the vehicle toward an operator's seat of the vehicle when the dash panel is displaced toward the operator's seat. The pedal-backward-displacement preventing device includes a connecting member which is disposed between the pedal bracket and a reinforcement member of the vehicle and connects the pedal bracket with the reinforcement member, and which is deformable in the event of displacement of the dash panel toward the operator's seat, wherein the connecting member includes a contactable portion which is to be brought into contact with the operating pedal upon deformation of the connecting member, for thereby causing the operating pedal to be pivoted in such a direction that causes the depressable portion to be displaced in the forward direction of the vehicle.

According to the second aspect of the invention, in the pedal-backward-displacement preventing device defined in the first aspect of the invention, the operating pedal is pivotable about an axis which is substantially parallel to a transverse direction of the vehicle, wherein the connecting member is deformable by displacement of the pedal bracket relative to the reinforcement member when the pedal bracket together with the dash panel is displaced toward the operator's seat.

According to the third aspect of the invention, in the pedal-backward-displacement preventing device defined in the second aspect of the invention, the connecting member is connected with at least one of the pedal bracket and the reinforcement member such that the connecting member is pivotable about the axis relative to the above-described at least one of the pedal bracket and the reinforcement member, wherein the connecting member is, upon deformation thereof due to the displacement of the pedal bracket relative to the reinforcement member, pivotable about the axis in such a direction that causes the contactable portion to be brought into contact with the operating pedal, for thereby causing the operating pedal to be pivoted about the axis.

According to the fourth aspect of the invention, in the pedal-backward-displacement preventing device defined in the third aspect of the invention, the operating pedal and the connecting member are connected with the pedal bracket through a common support shaft whose axis corresponds to the axis.

According to the fifth aspect of the invention, in the pedal-backward-displacement preventing device defined in any one of the first through fourth aspects of the invention, the operating pedal is pivotable about a first axis which is substantially parallel to a transverse direction of the vehicle, wherein the connecting member is deformable by displacement of the pedal bracket relative to the reinforcement member when the pedal bracket together with the dash panel is displaced toward the operator's seat, wherein the connecting member is connected with at least one of the pedal bracket and the reinforcement member such that the connecting member is pivotable relative to the at least one of the pedal bracket and the reinforcement member about a second axis that is substantially parallel to the first axis, and wherein the connecting member is, upon deformation thereof due to the displacement of the pedal bracket relative to the reinforcement member, pivotable about the second axis in such a direction that causes the contactable portion to be brought into contact with the operating pedal, for thereby causing the operating pedal to be pivoted about the first axis.

According to the sixth aspect of the invention, in the pedal-backward-displacement preventing device defined in the fifth aspect of the invention, the first axis and the second axis are spaced apart from each other, wherein the operating pedal is connected with the pedal bracket through a first support shaft whose axis corresponds to the first axis, while the connecting member is connected with the pedal bracket through a second support shaft whose axis corresponds to the second axis.

According to the seventh aspect of the invention, in the pedal-backward-displacement preventing device defined in the second through sixth aspects aspect of the invention, the contactable portion of the connecting member is brought into contact with a contactable portion of the operating pedal which is close to the axis such that a ratio of a distance between the axis and the depressable portion to a distance between the axis and the contactable portion of the operating pedal is not smaller than three.

According to the eighth aspect of the invention, in the pedal-backward-displacement preventing device defined in any one of the first through seventh aspects of the invention, the connecting member includes a deformable portion which has a lower degree of rigidity than the pedal bracket and which is deformable to have a predetermined deformed shape when the pedal bracket together with the dash panel is displaced toward the operator's seat in the event of the displacement of the dash panel toward the operator's seat.

According to the ninth aspect of the invention, in the pedal-backward-displacement preventing device defined in any one of the first through eighth aspects of the invention, the operating pedal is a parking brake pedal which is to be depressed at the depressable portion by a foot of the operator, for pulling a brake cable so as to generate a braking force.

The pedal-backward-displacement preventing device defined in each of the first through tenth aspects of the invention includes the connecting member which is disposed between the pedal bracket and the reinforcement member. The connecting member is plastically deformable owing to displacement of the pedal bracket relative to the reinforcement member, when the pedal bracket together with the dash panel is displaced toward the operator's seat in the event of displacement of the dash panel toward the operator's seat. The deformation of the connecting member causes the contactable portion of the connecting member to be brought into abutting contact with the operating pedal, whereby the depressable portion of the operating pedal is displaced in the forward direction of the vehicle. In this arrangement, the operating pedal is pivoted in the forward direction of the vehicle by the deformation of the connecting member even where the amount of the displacement of the dash panel relative to the reinforcement member is small, so that a spacing distance between the depressable portion of the operating pedal and the operator's seat is maintained irrespective of the displacement amount of the dash panel. The present pedal-backward-displacement preventing device has another technical advantage that the device can be used for even an operating pedal of a parking brake device which is not equipped with an operating rod connected with the operating pedal.

Further, the present pedal-backward-displacement preventing device, in which the backward displacement of the operating pedal is prevented owing to the deformation of the connecting member, can prevent the backward displacement of the operating pedal more reliably, and can be designed and manufactured more easily, than the conventional device which depends on disconnection of two members from each other for preventing the backward displacement of the operating pedal. It is noted that a ratio of the amount of pivot motion of the operating pedal to the amount of displacement of the dash panel (relative to the reinforcement member) can be easily adjusted, for example, by adjusting a ratio of the deformation amount of the connecting member to the displacement amount of the dash panel, a ratio of the amount of pivot motion of the connecting member to the displacement amount of the dash panel, or a position of the contactable portion of the operating pedal.

The depressable portion of the operating pedal is preferably displaced by the deformation of the dash panel, to be positioned on the forward side of the original position of the depressable portion of the operating pedal. However, the depressable portion may be somewhat displaced toward the operator's seat in the backward direction of the vehicle, as long as the depressable portion is displaced relative to the axis (about which the operating pedal is pivoted) in the forward direction of the vehicle so that the backward displacement of the depressable portion relative to the operator's seat is reduced owing to the arrangement defined in each aspect of the invention.

In the pedal-backward-displacement preventing device defined in the fourth aspect of the invention, the operating pedal and the connecting member are connected with the pedal bracket through the common support shaft whose axis corresponds to the axis about which the operating pedal is pivotable. This arrangement advantageously eliminates a necessity of provision of a shaft or other element which serves exclusively to connect the connecting member with the pedal bracket, thereby simplifying the construction of the device, and making it possible to manufacture the device at a reduced cost. Further, this arrangement permits utilization of a conventional pedal bracket, simply by connecting the conventional pedal bracket with the connecting member adapted to include the contactable portion, through the common support shaft.

In the pedal-backward-displacement preventing device defined in the fifth aspect of the invention, the connecting member is connected with the pedal bracket or the reinforcement member such that the connecting member is pivotable relative to the pedal bracket or the reinforcement member about the second axis that is substantially parallel to the first axis about which the operating pedal is pivotable. The connecting member is, upon its deformation due to the displacement of the pedal bracket relative to the reinforcement member, pivoted about the second axis in such a direction that causes the contactable portion to be brought into abutting contact with the operating pedal, so that the abutting contact of the contactable portion of the connecting member causes the operating pedal to be pivoted about the first axis. This arrangement provides a higher degree of freedom in determining the above-described ratio of the amount of pivot motion of the operating pedal to the amount of displacement of the dash panel relative to the reinforcement member, thereby making it possible to pivot the operating pedal reliably in a larger amount, than where the pivot motion of the operating pedal is caused by only the deformation of the connecting member.

In the pedal-backward-displacement preventing device defined in the sixth aspect of the invention in which the first axis and the second axis are spaced apart from each other, it is possible to adjust the amount of the pivot motion of the connecting member about the second axis and the amount of the pivot motion of the operating pedal about the first axis, by adjusting a positional relationship between the second axis and a portion of the connecting member in which the connecting member is connected to the reinforcement member. This arrangement provides a higher degree of freedom in determining the above-described ratio, thereby making it possible to pivot the operating pedal reliably in a larger amount, than where the connecting member and the operating pedal are connected with the pedal bracket through the common support shaft as in the fourth aspect of the invention.

In the pedal-backward-displacement preventing device defined in the seventh aspect of the invention, the contactable portion of the connecting member is brought into contact with the contactable portion of the operating pedal, which portion is close to the axis (about which the operating pedal is pivotable), so that the depressable portion of the operating pedal can be forwardly displaced in a large amount even with a small amount of deformation of the connecting member or a small amount of pivot motion of the connecting member.

In the pedal-backward-displacement preventing device defined in the eighth aspect of the invention, the connecting member is provided with the deformable portion which is configured to have a lower degree of rigidity than the pedal bracket and to be deformable to have a predetermined deformed shape in the event of the displacement of the dash panel toward the operator's seat, so that the operating pedal reliably pivoted as a result of the deformation of the connecting member, whereby the depressable portion of the operating pedal is assuredly displaced in the forward direction of the vehicle.

The principle of the present invention described above is advantageously applicable to, particularly, an operating pedal of a parking brake device which is not equipped with an operating rod connected with the operating pedal. However, the invention can be applied also to other types of operating pedals, each of which has in its lower end portion a depressable portion to be depressed in the forward direction of the vehicle, such as an accelerator pedal, a clutch pedal and a brake pedal of a service brake device which is equipped with an operating rod connected with the brake pedal.

The term "reinforcement member" of the vehicle may be interpreted to mean a member whose amount of backward displacement toward the operator's seat (due to an application of large load to a front portion of the vehicle in the backward direction of the vehicle) is smaller than the dash panel, or a member which is less likely to be backwardly displaced than the dash panel. In this sense, the reinforcement member may be referred also to as a stationary member, while the dash panel may be considered as a movable member. The reinforcement member may be, for example, an instrument panel reinforcement member or a cowl panel of the vehicle. It is noted that the dash panel is a partition wall separating a passenger compartment and an engine room of the vehicle from each other.

The contactable portion may be formed integrally with the other portion of the connecting member, or may be formed independently of the other portion of the connecting member so that the independently formed contactable portion is attached to the other portion by a welding or other suitable means. Further, the contactable portion may be provided by a protrusion portion of the connecting member which is arranged to protrude toward the operating pedal, or may be provided by a flat portion of the connecting member. In the latter case, the operating pedal may be provided with a protrusion portion which is arranged to be brought into abutting contact with the flat portion as the contactable portion. That is, the contactable portion should be interpreted to mean a portion of the connecting member which is arranged to be brought into abutting contact with the operating pedal, and does not necessary have to have a protrusion or other particular configuration.

The connecting member is connected with the pedal bracket and/or the reinforcement member such that the connecting member is pivotable about the second axis relative to the pedal bracket and/or the reinforcement member in the device defined in the fifth or sixth aspect of the invention. However, in the first or second aspect of the invention, the connecting member may be fixed integrally to both of the pedal bracket and the reinforcement member, or may be connected to both of pedal bracket and the reinforcement member such that connecting member is pivotable relative to the pedal bracket and the reinforcement member.

In the device defined in the fifth or sixth aspect of the invention in which the connecting member is connected with the pedal bracket and/or the reinforcement member, the connecting member may be connected with the pedal bracket and/or the reinforcement member through a bolt and a nut, a pin and a retaining ring or other suitable means, such that the connecting member is pivotable about the second axis when the pedal bracket and the reinforcement member are displaced relative to each other, so that the contactable portion of the connecting member is pivotable about the second axis so as to be brought into abutting contact with the operating pedal. Where the connecting member is connected with the pedal bracket, the connecting member may be connected with the pedal bracket with a certain degree of strength so that the connecting member serves as a pedal support for supporting the pedal bracket with a predetermined degree of rigidity.

While the operating pedal and the connecting member are connected with the pedal bracket commonly through the one support shaft in the fourth aspect of the invention, the operating pedal and the connecting member may be connected with the pedal bracket through the respective support shafts which are parallel with each other and spaced apart from each other in the fifth aspect of the invention.

In the seventh aspect of the invention, the contactable portion of the operating pedal, with which the contactable portion of the connecting member is to be brought into abutting contact, is close to the axis about which the operating pedal is pivotable, such that the ratio of the distance between the axis and the depressable portion to the distance between the axis and the contactable portion of the operating pedal is not smaller than three, preferably not smaller than four. However, the contactable portion of the operating pedal may be positioned such that the above-described ratio is smaller than three.

In the eighth aspect of the invention, the connecting member has the deformable portion, so that bending, buckling or other plastic deformation takes place necessarily in the deformable portion when the pedal bracket and the reinforcement member of the vehicle are displaced relative to each other. The deformable portion is configured to have a lower degree of rigidity so as to be more likely to be deformable, than the other portion of the connecting member and the pedal bracket. The deformable portion may be provided, for example, by forming a through-hole, an aperture, a cutout or a groove in the corresponding portion, adapting a width or thickness of the corresponding portion to be smaller than that of the other portion of the connecting member, or forming a plurality of beads on a circumferential surface of the corresponding portion. It is noted that the deformable portion may be formed integrally with the other portion of the connecting member, or may be formed independently of the other portion of the connecting member so that the independently formed deformable portion is attached to the other portion by a welding, a riveting or other suitable means.

BRIEF DESCRIPTION OF THE DRAWINGS

The above and other objects, features, advantages and technical and industrial significance of this invention will be better understood by reading the following detailed description of the presently preferred embodiments of the invention, when considered in connection with the accompanying drawings, in which.

DETAILED DESCRIPTION OF THE PREFERRED EMBODIMENTS

Figure 1A:
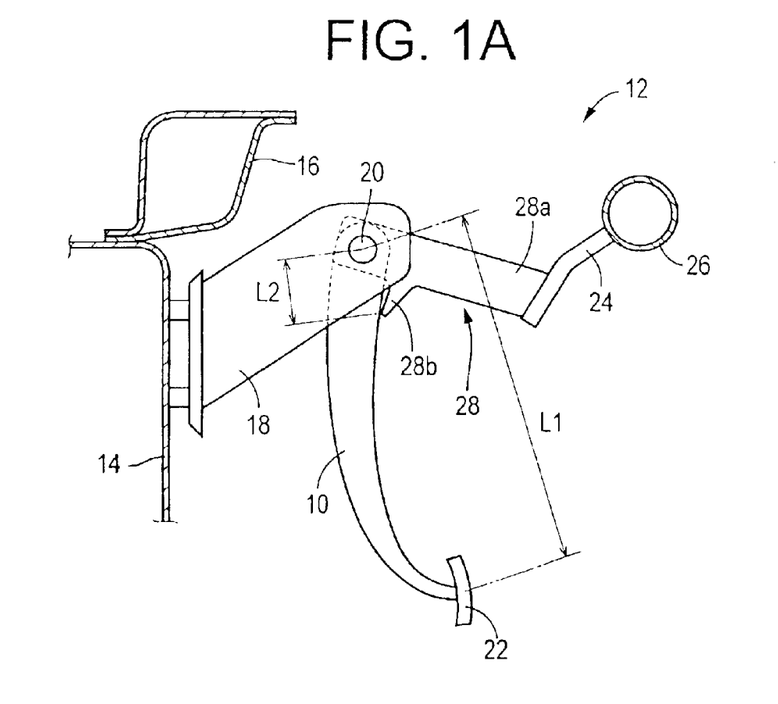
FIGS. 1A and 1B are views of a vehicle-pedal-backward-displacement preventing device constructed according to a first embodiment of the invention, explaining a change in the shape of a pedal support before and after deformation of a dash panel of the vehicle.
Figure 1B:
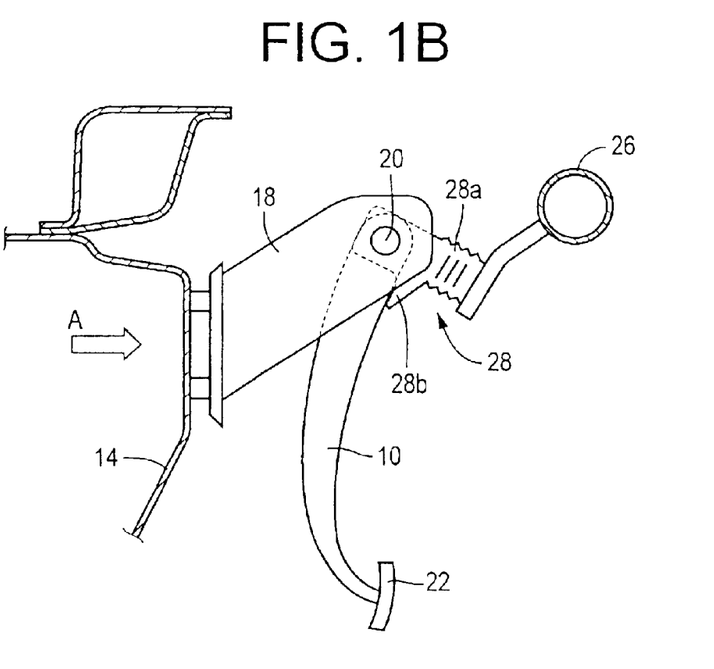

Referring first to FIGS. 1A and 1B, there will be described a vehicle-pedal-backward-displacement preventing device 12 constructed according to a first embodiment of this invention. FIGS. 1A and 1B are views of the backward-displacement preventing device 12 as viewed in a transversal direction of a vehicle in which the device 12 is installed. FIG. 1A illustrates the backward-displacement preventing device 12 in a normal state. FIG. 1B illustrates the device 12 in the event of displacement of a dash panel 14 toward an operator's seat (not shown) of the vehicle in the rightward direction (as seen in the figures) indicated by the arrow A, for example, due to an accidental application of a large load to a front portion of the vehicle in the backward direction of the vehicle. The dash panel 14 is a partition wall separating a passenger compartment and an engine room of the vehicle from each other, and is attached at its upper end to a cowl panel 16. A pedal bracket 18 is attached to a surface of the dash panel 14 which faces the passenger compartment. An operating pedal in the form of a brake pedal 10 is supported by the pedal bracket 18 through a support shaft 20 which is arranged to extend substantially in parallel with a horizontal direction and also the transversal (right and left) direction of the vehicle. The brake pedal 10 is rotatable or pivotable about an axis of the support shaft 20, so that the brake pedal 10 outputs an operating force via an output member (not shown) such as an operating rod when a depressable portion in the form of a pedal pad 22 (provided by a lower end portion of the brake pedal 10) is depressed in a forward direction (i.e., the leftward direction in the figures) of the vehicle by an operator of the vehicle.

The backward-displacement preventing device 12 serves to prevent the pedal pad 22 of the brake pedal 10 from being backwardly displaced toward the operator's seat in the event of displacement of the dash panel 14 toward the operator's seat, for example, due to application of a large load to the front portion of the vehicle in the backward direction of the vehicle. The backward-displacement preventing device 12 is principally constituted by a connecting member in the form of a pedal support 28 which is fixed to an instrument panel reinforcement member 26 via an attaching member 24. The attaching member 24 is fixed to the reinforcement member 26 by a welding, bolt or other suitable means. The pedal support 28 is fixed at its proximal end to the attaching member 24 by a welding, bolt or other suitable means, such that the proximal end of the pedal support 28 is located in a position lower than a position of the support shaft 20. The pedal support 28 is connected at its distal end portion to the pedal bracket 18 through the above-described support shaft 20 as a common support shaft, such that the pedal support 28 is rotatable or pivotable about the axis of the support shaft 20 relative to the pedal bracket 18. The support shaft 20 is provided with retainer rings which are fitted on axially opposite end portions of the support shaft 20, so that the support shaft 20 is prevented from being removed from the pedal bracket 18, the brake pedal 10 and the pedal support 28.

The pedal support 28 includes a deformable portion 28a provided by its proximal end portion, i.e., its portion located close to the attaching member 24. The deformable portion 28a is configured to have a lower degree of rigidity than the pedal bracket 18, so that the deformable portion 28a is bent to be convexed in the transversal (right or left) direction of the vehicle, or buckled like an accordion. To this end, the deformable portion 28a is provided with at least one easily deformable or collapsible section having a bead or beads, a cutout or cutouts, a groove or grooves, or a corrugated part or parts, which is/are formed in a suitable direction for permitting the deformable portion 28a to be bent or buckled as described above. Since the proximal end of the pedal support 28 (at which the pedal support 28 is connected to the attaching member 24) is located lower than the support shaft 20, the pedal support 28 is pivoted relative to the pedal bracket 18 about the axis of the support shaft 20 in the clockwise direction (as seen in the figures) when the support shaft 20 is displaced in the rightward direction (as seen in the figures) as a result of buckling or plastic deformation of the deformable portion 28a of the pedal support 28. It is noted that the pedal support 28 can be pivoted relative to the pedal bracket 18 about the axis of the support shaft 20, also by adapting the attaching member 24 to be deformable in the event of the displacement of the dash panel 14 toward the operator's seat. In this case, the connecting member is constituted by the pedal support 28 and the attaching member 24, while the deformable portion is constituted by the attaching member 24.

The pedal support 28 further includes a contactable protrusion portion 28b which protrudes in a direction substantially perpendicular to a longitudinal direction of the pedal support 28 from a portion of the pedal support 28 close to the support shaft 20. The contactable protrusion portion 28b is brought into abutting contact with the brake pedal 10, when the pedal support 28 is pivoted about the axis of the support shaft 20 in the clockwise direction. The contactable protrusion portion 28b of the pedal support 28 forces the brake pedal 10 to be pivoted about the axis of the support shaft 20 in the clockwise direction, whereby the pedal pad 22 is displaced in the forward direction of the vehicle. A dimension or distance L2 between the axis of the support shaft 20 and the contactable protrusion portion 28b is sufficiently smaller than a dimension or distance L1 between the axis of the support shaft 20 and the pedal pad 22. An amount of the forward displacement of the pedal pad 22 depends upon a ratio of the distance L1 to the distance L2, which ratio is not smaller than three, more preferably, not smaller than four, so that the amount of the forward displacement of the pedal pad 22 is sufficiently large. Owing to this arrangement, the pedal pad 22 is displaced relative to the axis of the support shaft 20 in the forward direction of the vehicle, so that the distance between the pedal pad 22 and the operator's seat remains substantially the same as before the deformation of the dash panel 14, or is made larger than before the deformation of the dash panel 14. It is noted that the contactable protrusion portion 28b is arranged to allow the brake pedal 10 to be returned to its non-operated position defined by a stopper (not shown) fixed to the pedal bracket 18 in a normal state illustrated in FIG. 1A.

In the present backward-displacement preventing device 12, the pedal support 28 is disposed between the pedal bracket 18 and the reinforcement member 26, and connects the pedal bracket 18 with the reinforcement member 26. When the pedal bracket 18 together with the dash panel 14 is displaced toward the operator's seat, the pedal support 28 is pivoted about the axis of the support shaft 20 in the clockwise direction as a result of the displacement of the pedal bracket 18 relative to the reinforcement member 26, and the contactable protrusion portion 28b of the pedal support 28 is then brought into abutting contact with the brake pedal 10 as a result of the pivot motion of the pedal support 28, whereby the pedal pad 22 is displaced in the forward direction of the vehicle. In this arrangement, the pedal pad 22 is reliably displaced in the forward direction of the vehicle by the pivot motion of the pedal support 29 even where the displacement amount of the dash panel 14 is small, so that a spacing distance between the pedal pad 22 and the operator's seat is maintained in any case. The present backward-displacement preventing device 12 has another technical advantage that the device 12 can be used for even a brake pedal of a parking brake device which is not equipped with an operating rod connected with the brake pedal.

In the present backward-displacement preventing device 12 in which the backward displacement of the brake pedal 10 is prevented owing to the deformation of the deformable portion 28a of the pedal support 28, the pedal support 28 is configured and arranged for permitting the contactable protrusion portion 28b to be brought into abutting contact with the brake pedal 10 owing to the deformation of the deformable portion 28a in the event of deformation of the dash panel 14, while supporting the pedal bracket 18 and the brake pedal 10 with a predetermined supporting strength during a routine pedaling operation. The thus configured and arranged pedal support 28, including structure for connecting the pedal bracket 18 to the pedal support 28, is relatively easy to be designed and manufactured. As described above, the deformable portion 28a of the pedal support 28 is configured such that the deformable portion 28a is deformable to have a predetermined deformed shape as shown in FIG. 1B owing to the displacement of the pedal bracket 18 relative to the reinforcement member 26 in the event of deformation of the dash panel 14 while providing a sufficient rigidity without being deformed during a routine pedaling operation. The configuration of the deformable portion 28a is also relatively easy to be designed.

Further, a ratio of the amount of pivot motion of the brake pedal 10 (i.e., the amount of forward displacement of the pedal pad 22) to the amount of backward displacement of the dash panel 14 (relative to the reinforcement member 26) can be easily adjusted, for example, by adjusting a ratio of the amount of pivot motion of the pedal support 28 to the amount of backward displacement of the dash panel 14, or the above-described dimension or distance L2 between the axis of the support shaft 20 and the contactable protrusion portion 28b.

Further, in the present backward-displacement preventing device 12, the pedal support 28 is connected with the pedal bracket 18 through the support shaft 20 such that the pedal support 28 is pivotable relative to the pedal bracket 18, so that the displacement of the pedal bracket 18 relative to the reinforcement member 26 causes the pedal support 28 to be deformed and pivoted about the axis of the support shaft 20, whereby the contactable protrusion portion 28b of the pedal support 28 is brought into abutting contact with the brake pedal 10, for forcing the brake pedal 10 to be pivoted about the axis of the support shaft 20. This arrangement provides a higher degree of freedom in adjusting the amount of pivot motion of the brake pedal 10, than an arrangement in which the brake pedal 10 is pivoted by only the deformation of the pedal support 28. That is, this arrangement permits the brake pedal 10 to be reliably pivoted in a large amount.

Further, in the present backward-displacement preventing device 12, the brake pedal 10 and the pedal support 28 are connected with the pedal bracket 18 through the common support shaft 20. This arrangement advantageously eliminates a necessity of provision of a shaft or other element which serves exclusively to connect the pedal support 28 with the pedal bracket 18, thereby simplifying the construction of the device 12, and making it possible to manufacture the device 12 with a reduced cost. In addition, this arrangement permits utilization of a conventional pedal bracket as the pedal bracket 18, simply by connecting the conventional pedal bracket with the pedal support 28 which is adapted to have the deformable portion 28*a* and the contactable portion 28*b*, through the common support shaft 20.

Further, in the present backward-displacement preventing device 12 in which the contactable protrusion portion 28*b* of the pedal support 28 is arranged to be brought into abutting contact with a portion of the brake pedal 10 which portion is close to the support shaft 20, the pedal pad 22 is displaced in a large amount in the forward direction of the vehicle even where the pedal support 28 is pivoted in a small amount, so that the spacing distance between the pedal pad 22 and the operator's seat remains substantially the same as before the deformation of the dash panel 14, or is made larger than before the deformation of the dash panel 14.

Further, in the present backward-displacement preventing device 12 in which the pedal support 28 is provided with the deformable portion 28*a* which is configured to have the lower degree of rigidity than the pedal bracket 18, the deformable portion 28*a* is buckled or deformed to have a predetermined deformed shape while the pedal support 28 is pivoted in its entirety about the axis of the support shaft 20, as shown in FIG. 1B, in the event of the displacement of the dash panel 14 toward the operator's seat. The brake pedal 10 is reliably pivoted as a result of the pivot motion of the pedal support 28, whereby the pedal pad 22 of the brake pedal 10 is assuredly displaced in the forward direction of the vehicle.

Figure 2A:
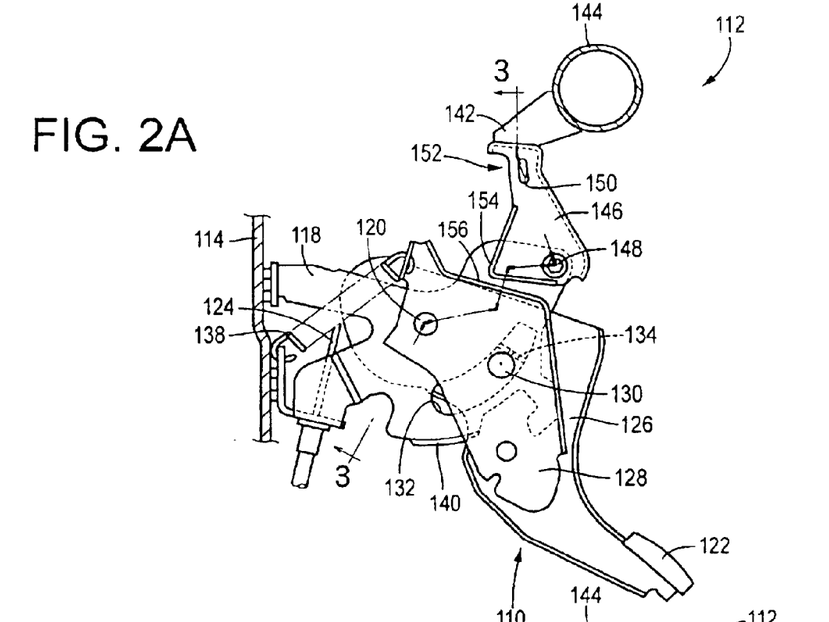
FIGS. 2A and 2B are views of a vehicle-pedal-backward-displacement preventing device constructed according to a second embodiment of the invention, explaining a change in the shape of a pedal support before and after deformation of a dash panel of the vehicle.
Figure 2B:
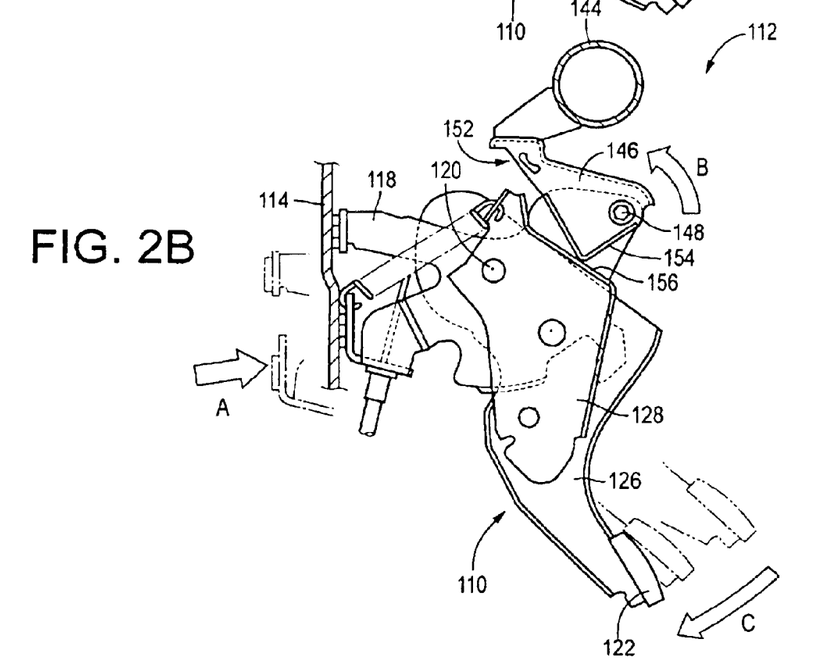

Referring next to FIGS. 2A and 2B, there will be described a vehicle-pedal-backward-displacement preventing device 112 constructed according to a second embodiment of this invention. FIGS. 2A and 2B are views of the backward-displacement preventing device 112 as viewed in a transversal direction of a vehicle in which the device 112 is installed. FIG. 2A illustrates the backward-displacement preventing device 112 in a normal state. FIG. 2B illustrates the device 112 in the event of displacement of a dash panel 114 toward an operator's seat (not shown) of the vehicle in the rightward direction (as seen in figures) indicated by the arrow A, for example, due to an accidental application of large load to a front portion of the vehicle in the backward direction of the vehicle. The dash panel 114 is a partition wall separating a passenger compartment and an engine room of the vehicle from each other. A pedal bracket 118 provided by a plate member is attached to a surface of the dash panel 114 which faces the passenger compartment. An operating pedal in the form of a parking brake pedal 110 is supported by the pedal bracket 118 through a support shaft 120 which is arranged to extend substantially in parallel with a horizontal direction and also the transversal (right and left) direction of the vehicle. The brake pedal 110 is rotatable or pivotable about an axis of the support shaft 120, so that the brake pedal 110 pulls a brake cable 124 so as to generate a braking force when a depressable portion in the form of a pedal pad 122 (provided by a lower end portion of the brake pedal 110) is depressed in a forward direction (i.e., the leftward direction in the figures) of the vehicle by an operator of the vehicle.

Figure 3:
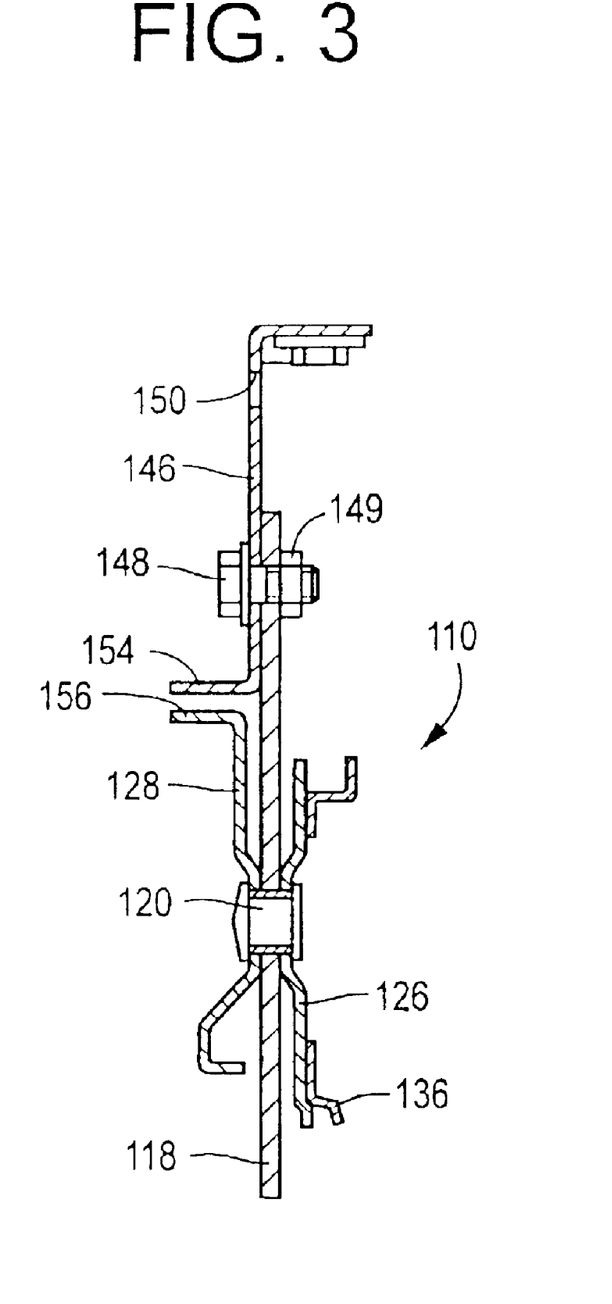
FIG. 3 is a cross sectional view taken along line 3—3 of FIG. 2A.

The brake pedal 110 includes first and second pedal plates 126, 128 which are disposed on respective opposite sides of the pedal bracket 118. The first and second pedal plates 126, 128 are connected with each other through the above-described support shaft 120 and a caulked pin 130, so that the pedal plates 126, 128 are pivotable together with each other about the axis of the support shaft 120. The caulked pin 130 passes through an arcuate aperture 132 which is formed through the pedal bracket 118. The brake pedal 110 provided by the pedal plates 126, 128 is normally held in its non-operated position which is defined by contact of the pin 130 with a stopper 134 formed in the pedal bracket 118. The first pedal plate 126 is provided with the above-described pedal pad 122. A cable guide 136 is fixed to the first pedal plate 126, as shown in FIG. 3 which is a cross sectional view taken along line 3—3 of FIG. 2A, so that the brake cable 124 is engaged at its end portion with the cable guide 136. A return spring 138 is engaged at one of opposite end portions with the second pedal plate 128, for thereby biasing the brake pedal 110 toward the non-operated position, i.e., in the counter-clockwise direction (as seen in FIGS. 2A and 2B) about the axis of the support shaft 120. The pedal bracket 118 is provided with a ratchet 140 which can be brought into meshing engagement with a pawl (not shown) provided in the brake pedal 110, for holding the brake pedal 110 in its operated position so as to maintain activation of the parking brake device.

The backward-displacement preventing device 112 serves to prevent the pedal pad 122 of the brake pedal 110 from being backwardly displaced toward the operator's seat in the event of displacement of the dash panel 114 toward the operator's seat, for example, due to application of large load to the front portion of the vehicle in the backward direction of the vehicle. The backward-displacement preventing device 112 is principally constituted by a connecting member in the form of a pedal support 146 which is fixed to an instrument panel reinforcement member 144 via an attaching member 142. The attaching member 142 is fixed to the reinforcement member 144 by a welding or other suitable means. The pedal support 146 is fixed at its upper or proximal end portion to a portion of the attaching member 142 by bolts or other suitable means, such that the portion of the attaching member 142 is located in a position which is higher than a position of the support shaft 120 and which is on the rear side of the position of the support shaft 120. The pedal support 146 is connected at its lower or distal end portion to the pedal bracket 118 through a connecting bolt 148 that is substantially parallel to the support shaft 120, such that the connecting bolt 148 is located in a position which is lower than a position of the above-described portion of the attaching member 142 and which is on the rear side of the position of the portion of the attaching member 142.

The pedal support 146, supporting the pedal bracket 118, is configured to be generally U-shaped in its cross section, for obtaining a certain degree of rigidity. The pedal support 146 and the pedal bracket 118 are tightened or fixed to each other by and between the connecting bolt 148 as an externally threaded member and a nut 149 as an internally threaded member, with a certain value of wrenching torque which is determined such that the pedal support 146 is allowed to be pivoted relative to the pedal bracket 118 about an axis of the connecting bolt 148 in the counter-clockwise direction as indicated by the arrow B in FIG. 2B when the pedal bracket 118 together with the dash panel 114 is displaced toward the operator's seat as indicated by the arrow A in the event of accidental deformation of the dash panel 114, and such that a positional relationship between the pedal support 146 and the pedal bracket 118 is held constant without the pivot motion of the pedal support 146 relative to the pedal bracket 118 during a routine pedaling operation except in the event of deformation of the dash panel 114.

The pedal support 146 includes a deformable portion 152 provided by its proximal end portion at which the pedal support 146 is connected to the attaching member 142. The deformable portion 152 has an elongated hole 150 so that the deformable portion 152 has a lower degree of rigidity than the pedal bracket 118. When the pedal bracket 118 together wit the dash panel 114 is displaced toward the operator's seat as indicated by the arrow A, the deformable portion 152 having the elongated hole 150 is bent or plastically deformed by the displacement of the pedal bracket 118 relative to the reinforcement member 144 and the attaching member 142, thereby causing the pedal support 146 to be pivoted about the axis of the connecting bolt 148 in the counter-clockwise direction. In the present embodiment, the support shaft 120 and the connecting bolt 148 correspond to first and second support shafts, respectively. The axes of the support shaft 120 and the connecting bolt 148 correspond to first and second axes, respectively.

The pedal support 146 has a contactable protrusion portion 154 in its lower or distal end portion such that the contactable protrusion portion 154 is located on the forward side of the connecting bolt 148, i.e., on the left side of the connecting bolt 148 as seen in FIG. 2A. The contactable protrusion portion 154 has a substantially triangular shape, and is arranged to protrude toward the brake pedal 110. When the pedal support 146 is pivoted about the axis of the connecting bolt 148 in the counter-clockwise direction as indicated by the arrow B, the contactable protrusion portion 154 is brought into abutting contact with a contactable flat portion 156 of the brake pedal 110, thereby pivoting the brake pedal 110 about the axis of the support shaft 120 in the clockwise direction as indicated by the arrow C, and accordingly causing the pedal pad 122 to be displaced in the forward direction of the vehicle. Each of the contactable protrusion portion 154 of the pedal support 146 and the contactable flat portion 156 of the brake pedal 110 is bent at its end part, so as to be generally L-shaped in its cross section as shown in FIG. 3, so that the contactable portions 154, 156 can be reliably brought into mutual face-to-face contact in large areas.

A dimension or distance L2 between the axis of the support shaft 120 and the contactable protrusion portion 156 is sufficiently smaller than a dimension or distance L1 between the axis of the support shaft 120 and the pedal pad 122. An amount of the forward displacement of the pedal pad 122 depends upon a ratio of the distance L1 to the distance L2, which ratio is not smaller than three, more preferably, not smaller than four, so that the amount of the forward displacement of the pedal pad 122 is sufficiently large, whereby the pedal pad 122 remains in the same position (as indicated by one-dot chain line in FIG. 2B) as before the deformation of the dash panel 114, or is positioned in the forward side of the position indicated by the one-dot chain line. It is noted that two-dot chain line of FIG. 2B indicates the position of the pedal pad 122 in a case where the brake pedal 110 is displaced together with the dash panel 114 in the backward direction.

In the present backward-displacement preventing device 112, the pedal support 146 is disposed between the pedal bracket 118 and the reinforcement member 144, and connects the pedal bracket 118 with the reinforcement member 144. When the pedal bracket 118 together with the dash panel 114 is displaced toward the operator's seat, the pedal support 146 is pivoted about the axis of the connecting bolt 148 in the counter-clockwise direction as a result of the deformation of the deformable portion 152 of the pedal support 146, and the contactable protrusion portion 154 of the pedal support 146 is then brought into abutting contact with the contactable flat portion 156 of the brake pedal 110 as a result of the pivot motion of the pedal support 146, whereby the pedal pad 122 is displaced in the forward direction of the vehicle. The present backward-displacement preventing device 112 can be thus used for even the parking brake pedal 110 of the parking brake device which is not equipped with an operating rod connected with the brake pedal 110. Further, the present device 112 has another technical advantage that the pedal pad 122 is reliably displaced in the forward direction of the vehicle by the pivot motion of the pedal support 146 even where the displacement amount of the dash panel 114 is small, so that the spacing distance between the pedal pad 22 and the operator's seat is maintained in any case.

In the present backward-displacement preventing device 112 in which the backward displacement of the brake pedal 110 is prevented owing to the deformation of the deformable portion 152 of the pedal support 146, the pedal support 146 is configured and arranged for permitting the contactable protrusion portion 154 to be brought into abutting contact with the brake pedal 110 owing to the deformation of the deformable portion 152 in the event of deformation of the dash panel 114, while supporting the pedal bracket 118 and the brake pedal 110 with a predetermined supporting strength during a routine pedaling operation. The thus configured and arranged pedal support 146, including structure for connecting the pedal bracket 118 to the pedal support 146, is relatively easy to be designed and manufactured. As described above, the deformable portion 152 of the pedal support 146 is configured such that the deformable portion 152 is deformable to have a predetermined deformed shape as shown in FIG. 2B owing to the displacement of the pedal bracket 118 relative to the reinforcement member 144 in the event of deformation of the dash panel 114 while providing a sufficient rigidity without being deformed during a routine pedaling operation. The configuration of the deformable portion 28*a*, such as the size of the elongated hole 150 and a direction in which the elongated hole 150 is elongated, is also relatively easy to be designed.

Further, a ratio of the amount of pivot motion of the brake pedal 110 (i.e., the amount of forward displacement of the pedal pad 122) to the amount of backward displacement of the dash panel 114 (relative to the reinforcement member 144) can be easily adjusted, for example, by adjusting a ratio of the amount of pivot motion of the pedal support 146 to the amount of backward displacement of the dash panel 114, or the above-described dimension or distance L2 between the axis of the support shaft 120 and the contactable protrusion portion 154 (or between the axis of the support shat 120 and the contactable flat portion 156).

Further, in the present backward-displacement preventing device 112, the pedal support 146 is connected with the pedal bracket 118 through the connecting bolt 148 such that the pedal support 146 is pivotable relative to the pedal bracket 118, so that the displacement of the pedal bracket 118 relative to the reinforcement member 144 causes the pedal support 146 to be deformed and pivoted about the axis of the connecting bolt 148, whereby the contactable protrusion portion 154 of the pedal support 146 is brought into abutting contact with the brake pedal 110, for forcing the brake pedal 110 to be pivoted about the axis of the support shaft 120. This arrangement provides a higher degree of freedom in adjusting the amount of pivot motion of the brake pedal 110, than an arrangement in which the brake pedal 110 is pivoted by only the deformation of the pedal support 146. That is, this arrangement permits the brake pedal 110 to be reliably pivoted in a large amount.

Further, in the present backward-displacement preventing device 112 in which the contactable protrusion portion 154 of the pedal support 146 is arranged to be brought into abutting contact with the contactable flat portion 156 of the brake pedal 110 which portion is close to the support shaft 120, the pedal pad 122 is displaced in a large amount in the forward direction of the vehicle even where the pedal support 146 is pivoted in a small amount, so that the spacing distance between the pedal pad 122 and the operator's seat remains substantially the same as before the deformation of the dash panel 114, or is made larger than before the deformation of the dash panel 114.

Further, in the present backward-displacement preventing device 112 in which the pedal support 146 is provided with the deformable portion 152 which is configured to have the lower degree of rigidity than the pedal bracket 118, the deformable portion 152 is bent or deformed to have a predetermined deformed shape while the pedal support 146 is pivoted in its entirety about the axis of the connecting bolt 148, as shown in FIG. 2B, in the event of the displacement of the dash panel 114 toward the operator's seat. The brake pedal 110 is reliably pivoted as a result of the pivot motion of the pedal support 146, whereby the pedal pad 122 of the brake pedal 110 is assuredly displaced in the forward direction of the vehicle.

Further, the present backward-displacement preventing device 112, in which the brake pedal 110 and the pedal support 146 are connected to the pedal bracket 118 through the respective first and second support shafts 120, 148 whose positions are adjustable independently of each other, provides a higher degree of freedom in determining the amounts of pivot movements of the pedal support 146 and the brake pedal 110 upon deformation of the dash panel 114, thereby making it possible to pivot the brake pedal 110 reliably in a larger amount, than the backward-displacement preventing device 12 of the above-described first embodiment of the invention in which the pedal support 28 and the brake pedal 10 are connected with the pedal bracket 18 through the common support shaft 20.

Figure 4A:
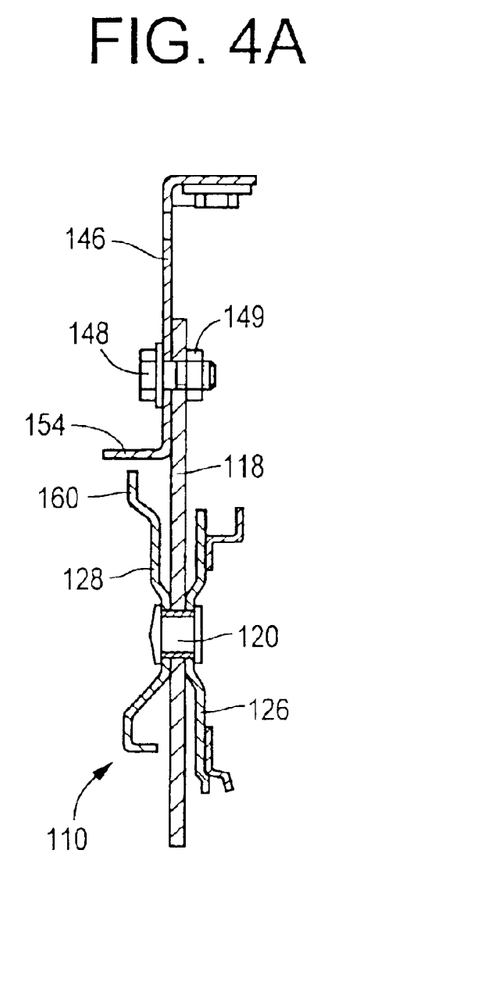
FIG. 4A is a cross sectional view of a modification of the vehicle-pedal-backward-displacement preventing device shown in FIGS. 2A, 2B and 3.
Figure 4B:
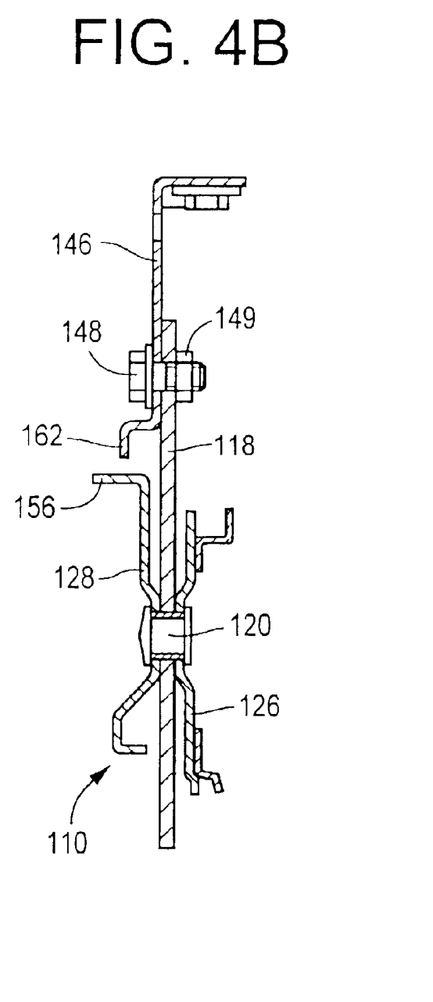
FIG. 4B is a cross sectional view of another modification of the vehicle-pedal-backward-displacement preventing device shown in FIGS. 2A, 2B and 3.

While each of the contactable portions 154, 156 is bent at its end part so as to be generally L-shaped in its cross section in the above-illustrated second embodiment, it is possible to modify such an arrangement for brining into abutting contact with the pedal support 146 as the connecting member and the brake pedal 110 as the operating pedal with each other. For example, the brake pedal 110 may include, in place of the above-described contactable portion 156, a contactable portion 160 which is configured to be brought into abutting contact at its edge with the contactable portion 154 of the pedal support 146, as shown in FIG. 4A. Further, the pedal support 146 may include, in place of the above-described contactable portion 154, a contactable portion 152 which is configured to be brought into abutting contact at its edge with the contactable portion 156 of the brake pedal 110, as shown in FIG. 4B. It is noted that each of FIGS. 4A and 4B is a cross sectional view of the device 112 as FIG. 3.

Figure 5A:
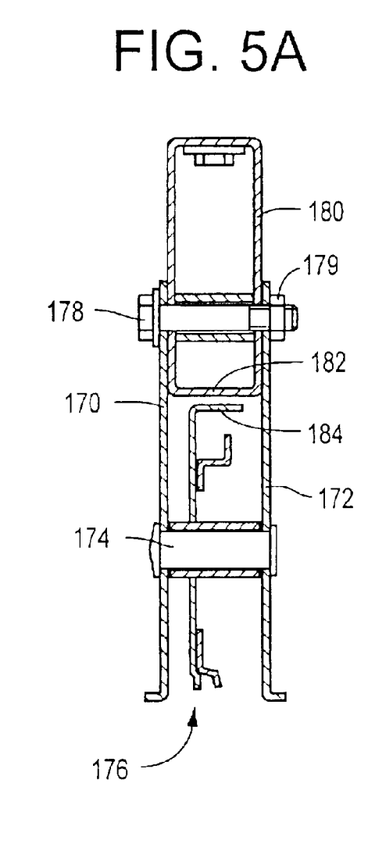
FIG. 5A is a cross sectional view of a vehicle-pedal-backward-displacement preventing device constructed according to a third embodiment of the invention.

FIG. 5A is a cross sectional view of a vehicle-pedal-backward-displacement preventing device constructed according to a third embodiment of the invention. While the parking brake pedal 110 is constituted principally by the pair of pedal plates 126, 128 disposed on respective opposite sides of the plate-like pedal bracket 118 in the above-illustrated second embodiment, the operating pedal in the form of a plate-like brake pedal 176 is interposed between two pedal brackets 170, 172 in the present third embodiment. The brake pedal 176 is supported by the pedal brackets 170, 172 through a support shaft 174 such that the brake pedal 176 is pivotable about the axis of the support shaft 174. The pedal brackets 170, 172 are connected to the connecting member in the form of a pedal support 180 through a connecting bolt 178 which is arranged to extend substantially in parallel to the support shaft 174. The pedal support 180 is deformed and pivoted about the axis of the connecting bolt 178 when the pedal brackets 170, 172 are displaced toward the operator's seat as a result of the deformation of the dash panel 114 in the event of an application of large load to the front portion of the vehicle in the backward direction of the vehicle. The pivot motion of the pedal support 180 causes a contactable portion 182 of the pedal support 180 to be brought into abutting contact with a contactable portion 184 of the brake pedal 176, whereby the brake pedal 176 is pivoted about the axis of the support shaft 174 in such a direction that causes the pedal pad of the brake pedal 176 to be displaced in the forward direction of the vehicle.

Figure 5B:
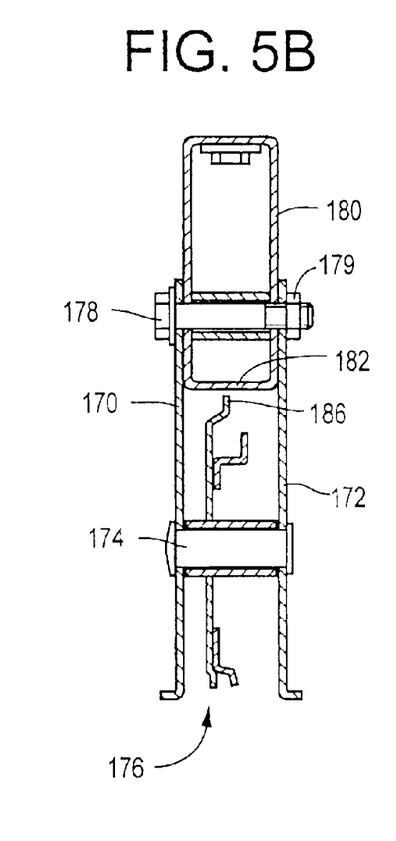
FIG. 5B is a cross sectional view of a modification of the vehicle-pedal-backward-displacement preventing device shown in FIG. 5A.
Figure 5C:
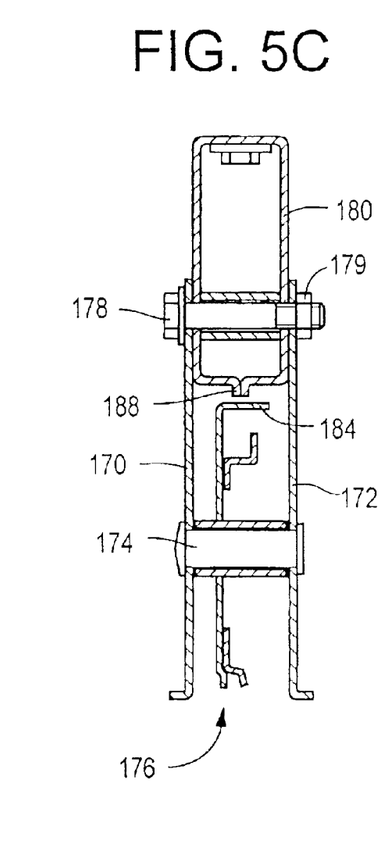
FIG. 5C is a cross sectional view of another modification of the vehicle-pedal-backward-displacement preventing device shown in FIG. 5A.

While the contactable portions 182, 184 include respective surfaces which are opposed to each other so as to be brought into face-to-face abutting contact with each other in the present embodiment of FIG. 5A, it is possible to modify such an arrangement for brining into abutting contact with the pedal support 180 as the connecting member and the brake pedal 176 as the operating pedal with each other. For example, the brake pedal 176 may include, in place of the above-described contactable portion 184, a contactable portion 186 which is configured to be brought into abutting contact at its edge with the surface of the contactable portion 182 of the pedal support 180, as shown in FIG. 5B. Further, the pedal support 180 may include, in place of the above-described contactable portion 182, a contactable portion 188 which is configured to be brought into abutting contact at its edge with the contactable portion 184 of the brake pedal 176, as shown in FIG. 5C. It is noted that each of FIGS. 5B and 5C is a cross sectional view as FIG. 5A.

While the presently preferred embodiments of the present invention have been illustrated above, it is to be understood that the invention is not limited to the details of the illustrated embodiments, but may be embodied with various other changes, modifications and improvements, which may occur to those skilled in the art, without departing from the spirit and scope of the invention defined in the following claims.

What is claimed is:

1. A pedal-backward-displacement preventing device for a vehicle having a dash panel, a pedal bracket attached to the dash panel, and an operating pedal pivotally supported by the pedal bracket and having in a lower end portion thereof a depressable portion to be depressed in a forward direction of the vehicle by an operator of the vehicle, said pedal-backward-displacement preventing device being capable of preventing the depressable portion of the operating pedal from being displaced in a backward direction of the vehicle toward an operator's seat of the vehicle when the dash panel is displaced toward the operator's seat, said pedal-backward-displacement preventing device comprising:

a connecting member which is disposed between said pedal bracket and a reinforcement member of the vehicle and connects the pedal bracket with the reinforcement member, and which is deformable in the event of displacement of the dash panel toward the operator's seat, wherein said connecting member includes a contactable portion which is, upon deformation of said connecting member, brought into contact with the operating pedal and directly forces the operating pedal to be pivoted in such a direction that causes the depressable portion to be displaced in said forward direction of the vehicle.

2. A pedal-backward-displacement preventing device according to claim 1, wherein the operating pedal is pivotable about an axis which is substantially parallel to a transverse direction of the vehicle, and wherein said connecting member is deformable by displacement of the pedal bracket relative to the reinforcement member when the pedal bracket together with the dash panel is displaced toward the operator's seat.

3. A pedal-backward-displacement preventing device according to claim 2, wherein said connecting member is connected with at least one of the pedal bracket and the reinforcement member such that said connecting member is pivotable about said axis relative to said at least one of the pedal bracket and the reinforcement member, and wherein said connecting member is, upon deformation thereof due to said displacement of the pedal bracket relative to the reinforcement member, pivotable about said axis in such a direction that causes said contactable portion of the connecting member to be brought into contact with the operating pedal, thereby causing the operating pedal to be pivoted about said axis.

4. A pedal-backward-displacement preventing device according to claim 3, wherein the operating pedal and said connecting member are connected with the pedal bracket through a common support shaft whose axis corresponds to said axis.

5. A pedal-backward-displacement preventing device according to claim 1, wherein the operating pedal is pivotable about a first axis which is substantially parallel to a transverse direction of the vehicle, wherein said connecting member is deformable by displacement of the pedal bracket relative to the reinforcement member when the pedal bracket and dash panel are displaced toward the operator's seat, wherein said connecting member is connected with at least one of the pedal bracket and the reinforcement member such that said connecting member is pivotable relative to at least one of the pedal bracket and the reinforcement member about a second axis that is substantially parallel to said first axis, and and wherein said connecting member is, upon deformation thereof due to said displacement of the pedal bracket relative to the reinforcement member, pivotable about said second axis in such a direction that causes said contactable portion of the connecting member to be brought into contact with the operating pedal, thereby causing the operating pedal to be pivoted about said first axis.

6. A pedal-backward-displacement preventing device according to claim 5, wherein said first axis and said second axis are spaced apart from each other, and wherein the operating pedal is connected with the pedal bracket through a first support shaft whose axis corresponds to said first axis, while said connecting member is connected with the pedal bracket through a second support shaft whose axis corresponds to said second axis.

7. A pedal-backward-displacement preventing device according to claim 2, wherein said contactable portion of said connecting member is brought into contact with a contactable portion of the operating pedal which is close to said axis such that a ratio of a distance between said axis and the depressable portion of the operating pedal to a distance between said axis and said contactable portion of the operating pedal is not smaller than three.

8. A pedal-backward-displacement preventing device according to claim 1, wherein said connecting member includes a deformable portion which has a lower degree of rigidity than the pedal bracket and which is deformable to have a predetermined deformed shape when the pedal bracket and the dash panel are displaced toward the operator's seat in the event of the displacement of the dash panel toward the operator's seat.

9. A pedal-backward-displacement preventing device according to claim 1, wherein the operating pedal is a parking brake pedal which is to be depressed at the depressable portion by a foot of the operator, for pulling a brake cable so as to generate a braking force.

\* \* \* \* \*